US011334243B2

(12) United States Patent
Yoshikawa

(10) Patent No.: US 11,334,243 B2
(45) Date of Patent: May 17, 2022

(54) INPUT CONTROL DEVICE

(71) Applicant: MITSUBISHI ELECTRIC CORPORATION, Tokyo (JP)

(72) Inventor: Satoshi Yoshikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/052,587

(22) PCT Filed: Jun. 11, 2018

(86) PCT No.: PCT/JP2018/022176
§ 371 (c)(1),
(2) Date: Nov. 3, 2020

(87) PCT Pub. No.: WO2019/239450
PCT Pub. Date: Dec. 19, 2019

(65) Prior Publication Data
US 2021/0240341 A1    Aug. 5, 2021

(51) Int. Cl.
*G06F 3/04886* (2022.01)
*G06F 3/0481* (2022.01)
(Continued)

(52) U.S. Cl.
CPC ........ *G06F 3/04886* (2013.01); *G06F 3/0481* (2013.01); *G06F 3/04842* (2013.01);
(Continued)

(58) Field of Classification Search
CPC .............. G06F 3/04886; G06F 3/0481; G06F 3/04842; G06F 2203/04803;
(Continued)

(56) References Cited

U.S. PATENT DOCUMENTS 6,075,531 A  *  6/2000  DeStefano .......... G06F 3/04812
                                                    715/788
10,705,698 B2 *  7/2020  Hanada ................. G06F 3/0482
(Continued)

FOREIGN PATENT DOCUMENTS

JP      2004-37294 A    2/2004
JP      2014-026588 A   2/2014
(Continued)

OTHER PUBLICATIONS

International Search Report, issued in PCT/JP2018/022176, PCT/ISA/210, dated Aug. 28, 2018.
(Continued)

*Primary Examiner* — Tuyetlien T Tran
(74) *Attorney, Agent, or Firm* — Birch, Stewart, Kolasch & Birch, LLP

(57) ABSTRACT

A plurality of operation regions configured to receive an operation and a plurality of expanded operation regions that are expanded in association with the plurality of operation regions are provided in a display region of a display device. An input control device includes an operation detection unit configured to detect the operation that is input to an overlap region where a part of each of the plurality of expanded operation regions overlaps each other, and an operation region control unit configured to select one expanded operation region that receives the operation out of the plurality of expanded operation regions having the overlap region, based on a predetermined priority condition, and control the plurality of expanded operation regions such that, of the plurality of operation regions, one operation region corresponding to the one expanded operation region receives the operation.

3 Claims, 12 Drawing Sheets

(51) Int. Cl.
*G06F 3/04842* (2022.01)
*G06F 3/0484* (2022.01)
*G06F 3/04845* (2022.01)
*G06F 3/0488* (2022.01)
*G06F 3/0486* (2013.01)

(52) U.S. Cl.
CPC .......... *G06F 3/0484* (2013.01); *G06F 3/0486* (2013.01); *G06F 3/0488* (2013.01); *G06F 3/04845* (2013.01); *G06F 2203/04803* (2013.01)

(58) Field of Classification Search
CPC .. G06F 3/04845; G06F 3/0486; G06F 3/0488; G06F 3/0484
See application file for complete search history.

(56) References Cited

U.S. PATENT DOCUMENTS

| | | | | |
|---|---|---|---|---|
| 2001/0025376 A1* | 9/2001 | Knobl | ................ | H04L 12/2805 725/74 |
| 2005/0225540 A1* | 10/2005 | Kawakami | .......... | G06F 3/04886 345/173 |
| 2008/0122796 A1* | 5/2008 | Jobs | .................... | G06F 3/04883 345/173 |
| 2008/0165160 A1* | 7/2008 | Kocienda | .......... | H04M 1/72403 345/175 |
| 2009/0005963 A1* | 1/2009 | Jarvinen | .......... | G08G 1/096883 701/533 |
| 2009/0228837 A1* | 9/2009 | Suzuki | .................. | B60K 35/00 715/841 |
| 2009/0271745 A1* | 10/2009 | Sakamoto | ............. | G06F 3/0481 715/859 |
| 2011/0083104 A1* | 4/2011 | Minton | ............... | G06F 3/04886 715/815 |
| 2011/0221693 A1* | 9/2011 | Miyazaki | ............ | G06F 3/04886 345/173 |
| 2011/0296340 A1* | 12/2011 | Nakagawa | ......... | B60H 1/00985 715/783 |
| 2011/0302519 A1* | 12/2011 | Fleizach | ............. | G06F 3/03547 715/773 |
| 2011/0307833 A1* | 12/2011 | Dale | .................... | G06F 3/0488 715/835 |
| 2012/0056819 A1* | 3/2012 | Peterson | ............. | G06F 3/04886 345/173 |
| 2012/0306768 A1* | 12/2012 | Bailey | .................. | G06F 1/1694 345/173 |
| 2014/0033095 A1* | 1/2014 | Koba | .................. | G06F 3/04817 715/765 |
| 2014/0096074 A1* | 4/2014 | Dojo | .................. | G06F 3/04812 715/788 |
| 2014/0164973 A1* | 6/2014 | Greenzeiger | ......... | G06F 40/232 715/773 |
| 2014/0192004 A1* | 7/2014 | Andersson | ............ | G06F 3/0488 345/173 |
| 2014/0354571 A1* | 12/2014 | Hatakeda | .............. | G06F 1/1671 345/173 |
| 2015/0234536 A1* | 8/2015 | Yamashita | .............. | B60K 37/06 345/178 |
| 2016/0253088 A1* | 9/2016 | Isozaki | .................. | G06F 3/0488 345/173 |
| 2016/0259470 A1* | 9/2016 | Ledet | .................... | G06F 3/0414 |
| 2017/0270924 A1* | 9/2017 | Fleurence | ............. | G10L 15/22 |
| 2018/0061153 A1* | 3/2018 | Ho | .............................. | G06K 9/22 |
| 2018/0201207 A1* | 7/2018 | Kim | .......................... | B60R 1/00 |
| 2018/0251122 A1* | 9/2018 | Golston | ............ | B60W 50/0098 |

FOREIGN PATENT DOCUMENTS

| | | |
|---|---|---|
| JP | 2015-49563 A | 3/2015 |
| JP | 2015-052865 A | 3/2015 |
| WO | WO 2013/089012 A1 | 6/2013 |
| WO | WO 2015/083264 A1 | 6/2015 |

OTHER PUBLICATIONS

Japanese Office Action for Japanese Application No. 2020-524951, dated May 11, 2021, with English translation.
Japanese Office Action for Japanese Application No. 2020-524951, dated Dec. 21, 2021, with English translation.

* cited by examiner

F I G. 8
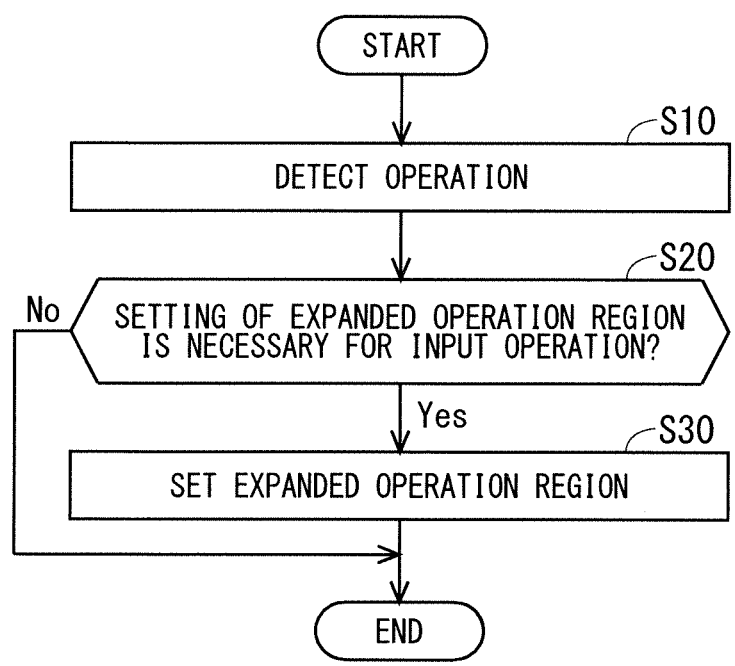

F I G. 1 8
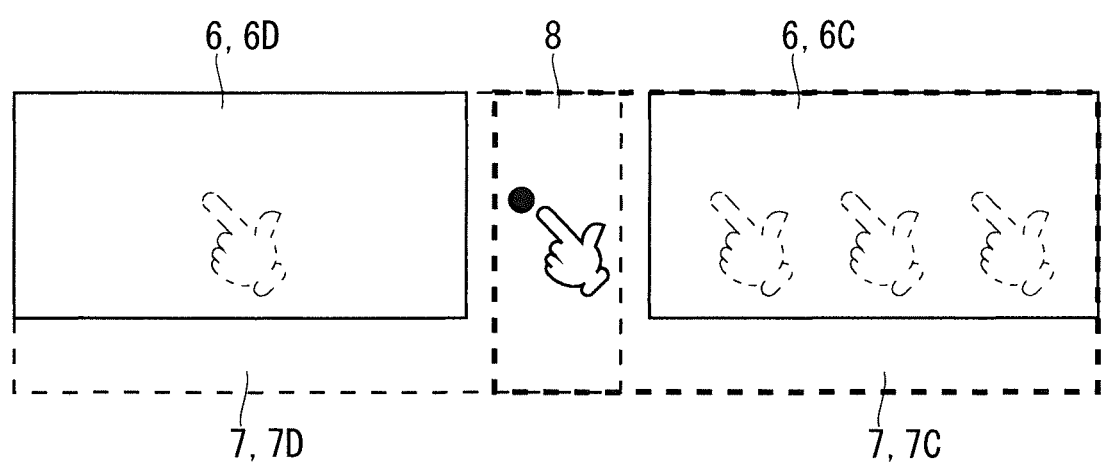

INPUT CONTROL DEVICE

TECHNICAL FIELD

The present invention relates to an input control device, an operation device, and an input control method.

BACKGROUND ART

There is a technique for improving operability of an input apparatus by expanding an operation region corresponding to an operation object based on an operation history in which a habit, a failure, and the like of a user using the input apparatus are recorded (e.g., see Patent Document 1).

An information processing apparatus disclosed in Patent Document 1 receives an input operation after applying an operation correction value compatible with an active user to an operation object capable of touch input. According to the information processing apparatus, an operation with an operation habit of an active user taken into consideration is achieved.

PRIOR ART DOCUMENT

Patent Document

Patent Document 1: Japanese Patent Application Laid-Open No. 2015-049563

SUMMARY

Problem to be Solved by the Invention

When a plurality of operation regions corresponding to a plurality of operation objects exist, there is a possibility that the expanded operation regions, which are the operation regions corrected by the operation correction values, overlap each other. In this case, the recognition accuracy in the user's operation is degraded. As a result, a function not intended by the user is executed, and the operability of the input apparatus by the user decreases.

The present invention has been made in order to solve the above problem, and an object of the present invention is to provide an input control device for improving the recognition accuracy in an input operation, even when each of a plurality of expanded operation regions formed by expansion of a plurality of operation regions overlaps each other.

Means to Solve the Problem

An input control device according to the present invention is an input control device configured to control a plurality of expanded operation regions based on an operation that is input to the plurality of expanded operation regions via an input device. A plurality of operation regions configured to receive an operation and the plurality of expanded operation regions that are expanded in association with the plurality of operation regions are provided in a display region of a display device. The input control device includes: an operation detection unit configured to detect the operation that is input to at least one overlap region where a part of each of the plurality of expanded operation regions overlaps each other; and an operation region control unit configured to select one expanded operation region that receives the operation out of the plurality of expanded operation regions having the at least one overlap region, based on a predetermined priority condition, and control the plurality of expanded operation regions such that, of the plurality of operation regions, one operation region corresponding to the one expanded operation region receives the operation.

Effects of the Invention

According to the present invention, it is possible to provide the input control device for improving the recognition accuracy in an input operation, even when each of a plurality of expanded operation regions formed by expansion of a plurality of operation regions overlaps each other.

Objects, features, aspects, and advantages of the present invention will become more apparent from the following detailed description and accompanying drawings.

BRIEF DESCRIPTION OF DRAWINGS

FIG. 8 is a flowchart showing a setting method for the expanded operation region in the second embodiment.

FIG. 18 is a diagram showing an example of operation regions and expanded operation regions in the fifth embodiment.

DESCRIPTION OF EMBODIMENTS

First Embodiment (Configuration of Input Control Device)

Figure 1:
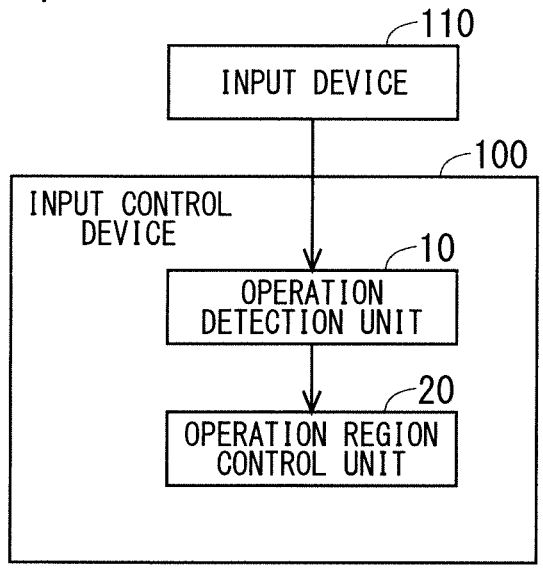
FIG. 1 is a block diagram showing a configuration of an input control device and a device that operates in association therewith in a first embodiment.

FIG. 1 is a block diagram showing a configuration of an input control device 100 and a device that operates in association therewith in a first embodiment.

The input control device 100 has an operation detection unit 10 and an operation region control unit 20. In FIG. 1, an input device 110 is shown as the device that operates in association with the input control device 100.

The input device 110 is a device that allows a user to input an operation to a plurality of operation regions or a plurality of expanded operation regions. The plurality of operation regions and the plurality of expanded operation regions are set for a display region of a display device (not shown). The plurality of operation regions are regions configured to receive operations by the user. The plurality of expanded operation regions are regions expanded in association with the plurality of operation regions. Each of the plurality of operation regions is set, for example, corresponding to an object in the display region of the display device, and a function set in the object is executed by the operation region receiving the operation. The function set in the object corresponding to the expanded operation region is executed also by the expanded operation region receiving the operation. Each of the plurality of expanded operation regions is set based on, for example, an erroneous operation on the operation region by the user or a habit of the operation by the user.

The input device 110 is, for example, a pointing device. The pointing device is, for example, a touch panel (touch screen), a touchpad, a stylus, a mouse, or the like. Alternatively, for example, the pointing device may be a wireless pointing device including a transmission device and a reception device. When the input device 110 is a touch panel, the input device 110 and the display device may be provided as an integrated device.

The input control device 100 controls the plurality of expanded operation regions based on an operation that is input to the input device 110.

The operation detection unit 10 detects an operation that is input to at least one overlap region where a part of each of the plurality of expanded operation regions overlaps each other.

The operation region control unit 20 selects one expanded operation region that receives the operation out of the plurality of expanded operation regions having the at least one overlap region, based on a predetermined priority condition. The predetermined priority condition is, for example, a condition based on the magnitude relation of the area of each operation region, the size relation of the operation region and the expanded operation region corresponding thereto, the difficulty level of a gesture included in the operation received by each operation region, the operation frequency of each operation region, and the like. The operation region control unit 20 controls the plurality of expanded operation regions such that, of the plurality of operation regions, one operation region corresponding to the one expanded operation region receives the operation detected by the operation detection unit 10.

The operation received by the expanded operation region controlled by the input control device 100 is output to, for example, an information processing device or the like (not shown). The information processing device executes a function associated with the one operation region corresponding to the one expanded operation region selected by the operation region control unit 20. For example, when an object has been set, the information processing device executes a function set in the object. In executing the function, the information processing device may cause the display device to display a display related to the function to be executed. The input control device 100, the input device 110, the display device, and the information processing device are devices constituting a part of a car navigation system, for example. However, the system is not limited thereto.

(Processing Circuit)

Figure 2:
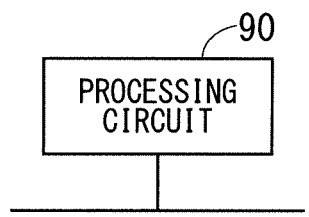
FIG. 2 is a diagram showing an example of a processing circuit included in the input control device in the first embodiment.

FIG. 2 is a diagram showing an example of a processing circuit 90 included in the input control device 100. The respective functions of the operation detection unit 10 and the operation region control unit 20 are achieved by the processing circuit 90. That is, the processing circuit 90 includes the operation detection unit 10 and the operation region control unit 20.

When the processing circuit 90 is dedicated hardware, the processing circuit 90 may be, for example, a single circuit, a composite circuit, a programmed processor, a parallel programmed processor, an application-specific integrated circuit (ASIC), a field-programmable gate array (FPGA), a combination thereof, or the like. The respective functions of the operation detection unit 10 and the operation region control unit 20 may be achieved individually by a plurality of processing circuits or may be achieved collectively by one processing circuit.

Figure 3:
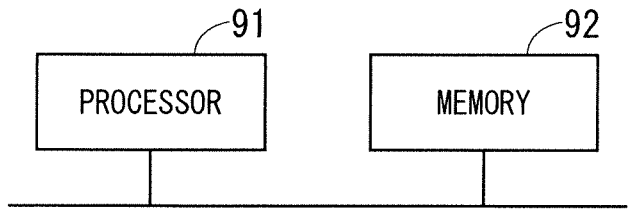
FIG. 3 is a diagram showing an example of the processing circuit included in the input control device in the first embodiment.

FIG. 3 is a diagram showing another example of the processing circuit included in the input control device 100. The processing circuit includes a processor 91 and a memory 92. The processor 91 executes a program stored in the memory 92, thereby achieving the respective functions of the operation detection unit 10 and the operation region control unit 20. For example, software or firmware written as a program is executed by the processor 91 to achieve each function. That is, the input control device includes the memory 92 for storing a program and the processor 91 for executing the program.

In the program, a function is written in which the input control device detects the operation that is input to the at least one overlap region where a part of each of the plurality of expanded operation regions overlaps each other; and the input control device selects one expanded operation region that receives the operation out of the plurality of expanded operation regions having the at least one overlap region, based on the predetermined priority condition, and controls the plurality of expanded operation regions such that, of the plurality of operation regions, one operation region corresponding to the one expanded operation region receives the operation. The program causes a computer to execute the procedure or method of each of the operation detection unit 10 and the operation region control unit 20.

The processor 91 may be, for example, a central processing unit, a processing device, an arithmetic unit, a microprocessor, a microcomputer, or a digital signal processor (DSP). The memory 92 is a nonvolatile or volatile semiconductor memory, such as random-access memory (RAM), read-only memory (ROM), flash memory, erasable programmable read-only memory (EPROM), or electrically erasable programmable read-only memory (EEPROM). Alternatively, the memory 92 may be any storage medium to be used in the future, such as a magnetic disk, a flexible disk, an optical disk, a compact disk, a mini-disk, or a digital versatile disk (DVD).

The respective functions of the operation detection unit 10 and the operation region control unit 20 described above may be partially achieved by dedicated hardware and partially achieved by software or firmware. As thus described, the processing circuit achieves each of the functions described above by hardware, software, firmware, or a combination thereof.

(Input Control Method)

Figure 4:
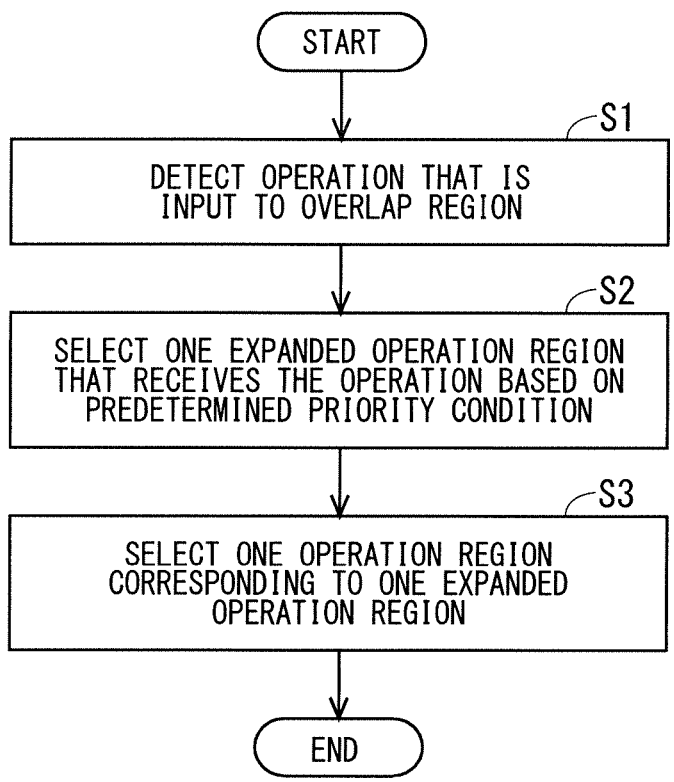
FIG. 4 is a flowchart showing the operation of the input control device and an input control method in the first embodiment.

FIG. 4 is a flowchart showing the operation of the input control device 100 and an input control method in the first embodiment.

In step S1, the operation detection unit 10 detects an operation that is input to the at least one overlap region.

In step S2, the operation region control unit 20 selects one expanded operation region that receives the operation out of the plurality of expanded operation regions having the at least one overlap region, based on the predetermined priority condition.

In step S3, the operation region control unit 20 selects one operation region corresponding to the one expanded operation region out of the plurality of operation regions. In this manner, the operation region control unit 20 controls the plurality of expanded operation regions such that the one operation region receives the operation detected by the operation detection unit 10.

(Effect)

In summary, the input control device 100 in the first embodiment is an input control device configured to control the plurality of expanded operation regions based on the operation that is input to the plurality of expanded operation regions via the input device 110. The plurality of operation regions configured to receive an operation and the plurality of expanded operation regions that are expanded in association with the plurality of operation regions are provided in the display region of the display device. The input control device 100 includes: the operation detection unit 10 configured to detect the operation that is input to the at least one overlap region where a part of each of the plurality of expanded operation regions overlaps each other; and the operation region control unit 20 configured to select one expanded operation region that receives the operation out of the plurality of expanded operation regions having the at least one overlap region, based on the predetermined priority condition, and controls the plurality of expanded operation regions such that, of the plurality of operation regions, one operation region corresponding to the one expanded operation region receives the operation.

With the above configuration, the input control device 100 can improve the recognition accuracy in an operation that is input to the overlap region. The input control device 100 can accurately recognize the operation reflecting the intention of the user, so that the operability of the input device 110 by the user can be improved in an appropriate manner.

In summary, the input control method in the first embodiment is an input control method controlling the plurality of expanded operation regions on the operation that is input to the plurality of expanded operation regions via the input device. The plurality of operation regions configured to receive an operation and the plurality of expanded operation regions that are expanded in association with the plurality of operation regions are provided in a display region of the display device. The input control method includes: detecting the operation that is input to the at least one overlap region where a part of each of the plurality of expanded operation regions overlaps each other; and selecting one expanded operation region that receives the operation out of the plurality of expanded operation regions having the at least one overlap region, based on the predetermined priority condition, and controlling the plurality of expanded operation regions such that, of the plurality of operation regions, one operation region corresponding to the one expanded operation region receives the operation.

According to the input control method described above, it is possible to improve the recognition accuracy in an operation that is input to the overlap region. Further, the operation reflecting the intention of the user can be accurately recognized, so that the operability of the input device 110 by the user can be improved in an appropriate manner.

Second Embodiment

An input control device, an operation device, and an input control method in a second embodiment will be described. Note that descriptions of the similar configuration and operation as those of the first embodiment will be omitted.

Figure 5:
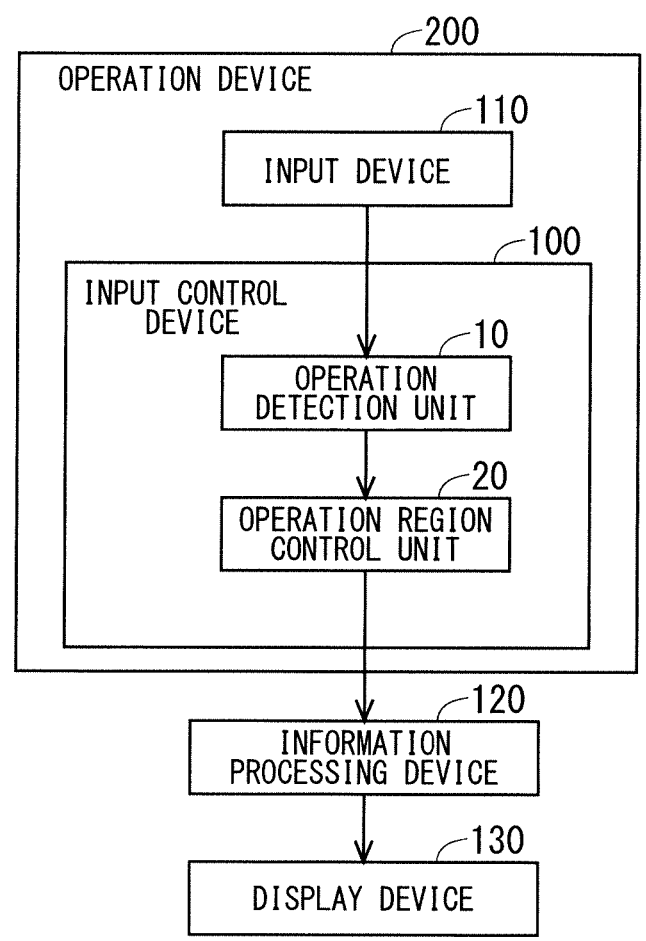
FIG. 5 is a block diagram showing a configuration of an input control device, an operation device, and devices that operate in association with those devices in a second embodiment.

FIG. 5 is a block diagram showing a configuration of an input control device 100, an operation device 200, and devices that operate in association with those devices in the second embodiment.

The operation device 200 has an input device 110 and the input control device 100.

An operation detection unit 10 detects an operation that is input to at least one overlap region.

An operation region control unit 20 selects one expanded operation region that receives the operation detected by the operation detection unit 10 out of a plurality of operation regions having the at least one overlap region, based on a predetermined priority condition. The predetermined priority condition is to preferentially select an expanded operation region corresponding to an operation region having an area smaller than an area of the other operation region out of the plurality of operation regions. The operation region control unit 20 further selects one operation region corresponding to the selected one expanded operation region out of the plurality of operation regions.

An information processing device 120 executes a function associated with the operation region selected by the input control device 100. At that time, the information processing device 120 may display a screen to be displayed during the execution of the function or after the execution of the function in the display region of a display device 130.

The display device 130 has a display region. The plurality of operation regions for receiving operations and a plurality of expanded operation regions expanded in association with the plurality of operation regions are set in the display region.

In the second embodiment, the display device 130 is a display unit included in a car navigation device. The input device 110 is a touch panel provided integrally with the display unit of the car navigation device. The information processing device 120 is, for example, a control device included in the car navigation device.

Figure 6:
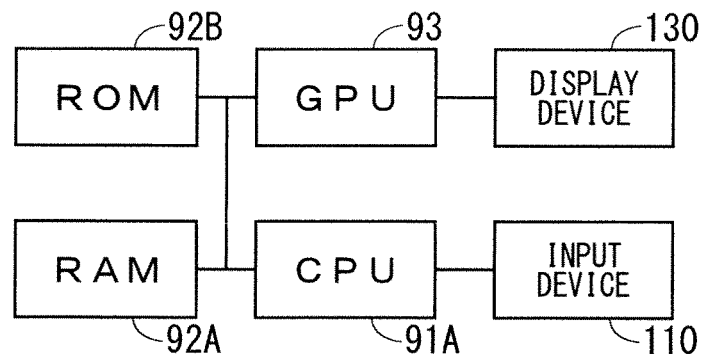
FIG. 6 is a diagram showing a hardware configuration of the input control device and devices that operate in association therewith in the second embodiment.

FIG. 6 is a diagram showing a hardware configuration of the input control device 100 and devices that operate in association therewith in the second embodiment.

The input control device 100 has a CPU 91A, a RAM 92A and a ROM 92B. The CPU 91A corresponds to the processor 91 in FIG. 3. The RAM 92A and the ROM 92B correspond to the memory 92 in FIG. 3. The CPU 91A, the RAM 92A, and the ROM 92B achieve the respective functions of the operation detection unit 10 and the operation region control unit 20. Further, the information processing device 120 has a graphics processing unit (GPU) 93. The GPU 93 controls a screen that is displayed on the display device 130. The input control device 100 may be integrated with the information processing device 120.

(Operation Region and Expanded Operation Region)

Figure 7:
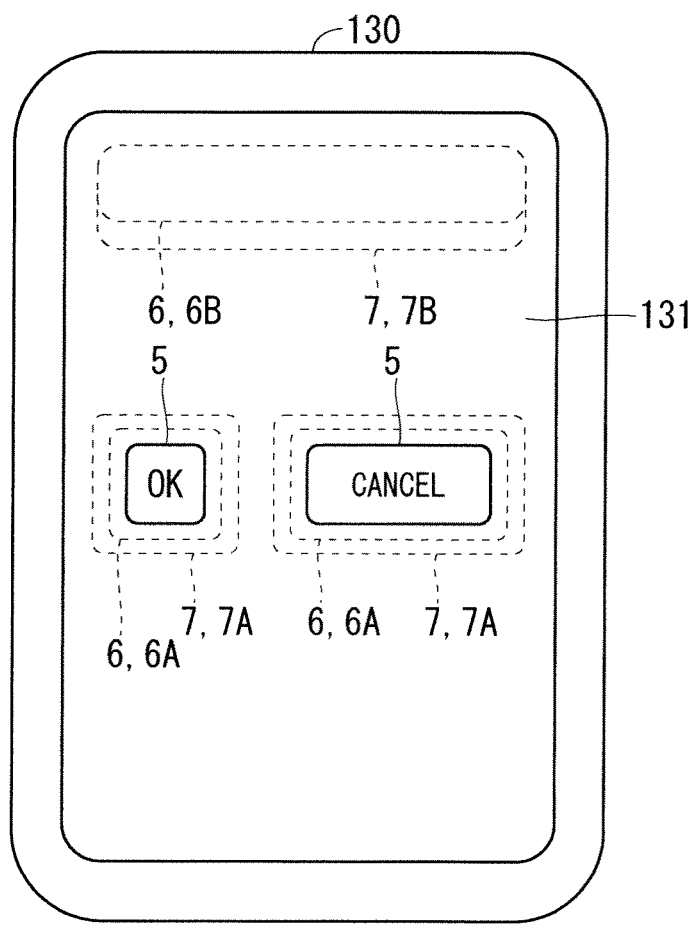
FIG. 7 is a diagram showing an example of operation regions and expanded operation regions in the second embodiment.

FIG. 7 is a diagram showing an example of operation regions 6 and expanded operation regions 7 in the second embodiment. For a display region 131 of the display device 130, a plurality of operation regions 6 for receiving operations and a plurality of expanded operation regions 7 expanded in association with the plurality of operation regions 6 are set.

An operation region 6A of the plurality of operation regions 6 is set corresponding to an object 5 which is displayed in the display region 131 and is visible. Here, the objects 5 of "OK" and "Cancel" are displayed in the display region 131. The operation region 6A is larger than the displayed object 5 and has a shape along the outer periphery of the object 5. An expanded operation region 7A expanded in association with the operation region 6A has a larger region than the operation region 6A. The operation region 6A or the expanded operation region 7A receives an operation tapped by a user in those regions. The information processing device 120 executes a function associated with the operation.

Each operation region 6 is not necessarily set corresponding to the visible object 5. An operation region 6B of the plurality of operation regions 6 is set in association with a region not visible in the upper part of the display region 131. An expanded operation region 7B corresponding to the operation region 6B has a larger region than the operation region 6B. For example, the operation region 6B or the expanded operation region 7B receives an operation by a user to perform flick or swipe downward in those regions. The information processing device 120 executes a function associated with the operation.

FIG. 8 is a flowchart showing a setting method for the expanded operation region 7 in the second embodiment.

In step S10, the operation detection unit 10 detects an operation.

In step S20, the operation region control unit 20 determines whether or not the setting of the expanded operation region 7 is necessary for the input operation. When the operation region control unit 20 determines that the setting of the expanded operation region 7 is necessary, step S30 is executed. When the operation region control unit 20 determines that the setting of the expanded operation region 7 is not necessary, the setting method for the expanded operation region 7 ends.

In step S30, the operation region control unit 20 sets the expanded operation region 7. At that time, the operation region control unit 20 refers to an operation history database in which an operation history is recorded. The operation region control unit 20 calculates and sets the expanded operation region 7 based on information on, for example, an erroneous operation on the operation region 6 by the user or a habit of the operation by the user.

The above setting method for the expanded operation region 7 is executed repeatedly. That is, the expanded operation region 7 is updated every time an operation is input to the input device 110. Therefore, a plurality of expanded operation regions corresponding to a plurality of operation regions adjacent to each other may be gradually enlarged, and at least one overlap region where each expanded operation region overlaps may be generated. The input control device 100 in the second embodiment controls each expanded operation region when an operation is input to any one of the overlap regions, and improves the recognition accuracy in the operation. The input control method will be described below.

(Input Control Method)

Figure 9:
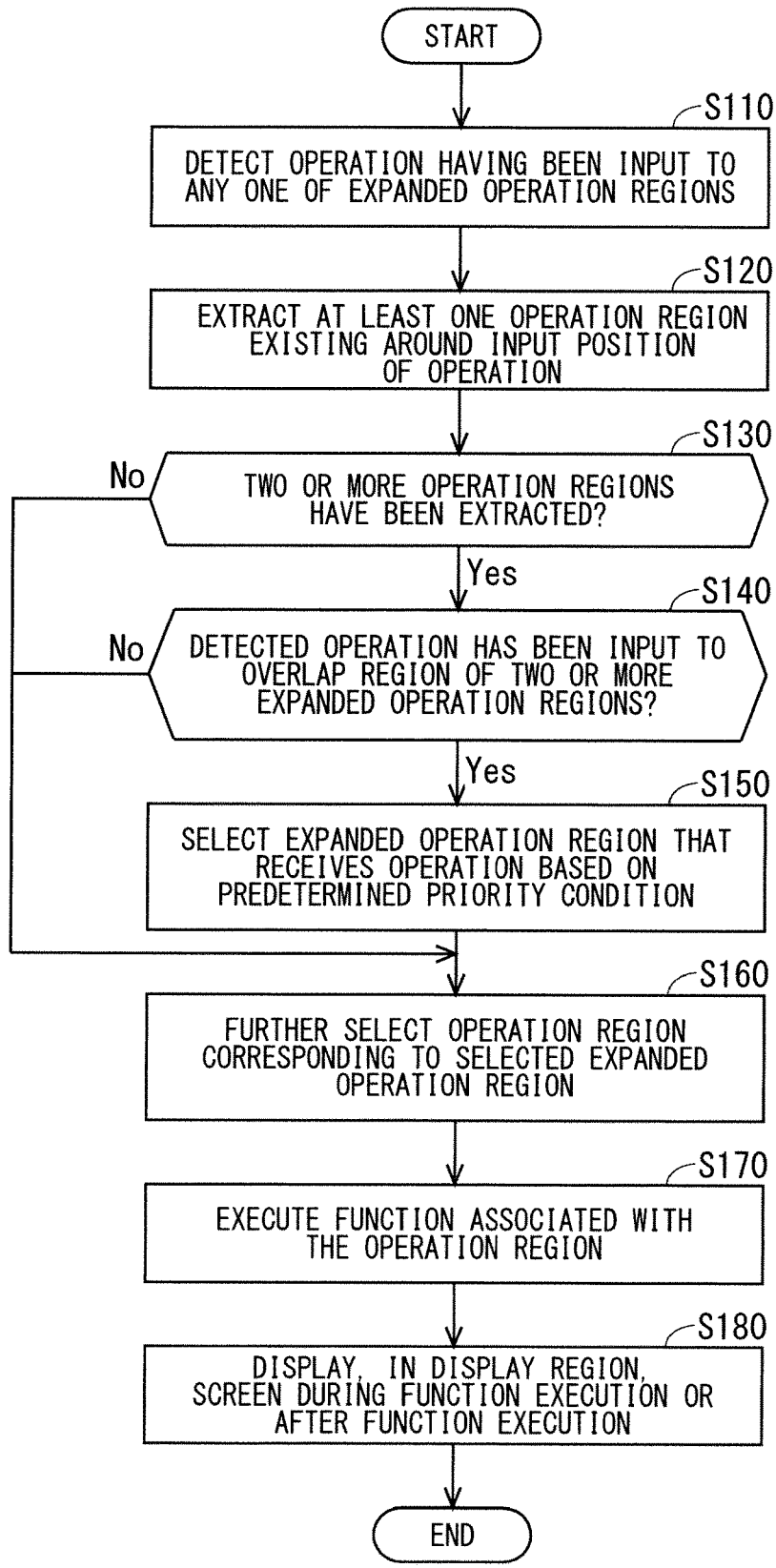
FIG. 9 is a flowchart showing the operation of the input control device and an input control method in the second embodiment.

FIG. 9 is a flowchart showing the operation of the input control device 100 and the input control method in the second embodiment.

In step S110, the operation detection unit 10 detects an operation having been input to any expanded operation region 7 out of the plurality of expanded operation regions 7 set in the display region 131.

In step S120, the operation region control unit 20 extracts at least one operation region 6 existing around the input position of the operation in the display region 131.

In step S130, the operation region control unit 20 determines whether or not two or more operation regions 6 have been extracted. When the operation region control unit 20 determines that two or more operation regions 6 have been extracted, step S140 is executed. When the operation region control unit 20 determines that only one operation region 6 has been extracted, step S160 is executed.

In step S140, the operation region control unit 20 determines whether or not the operation detected by the operation detection unit 10 has been input to at least one overlap region of the two or more expanded operation regions 7. When the operation region control unit 20 determines that the operation has been input to any one of the overlap regions, step S150 is executed. When the operation region control unit 20 determines that the operation has not been input to any one of the overlap regions, the operation region control unit 20 selects the expanded operation region 7 to which the operation has been input, and step S160 is expanded.

In step S150, the operation region control unit 20 selects one expanded operation region that receives the operation detected by the operation detection unit 10 out of the plurality of expanded operation regions 7 having the overlap region, based on the predetermined priority condition.

Figure 10:
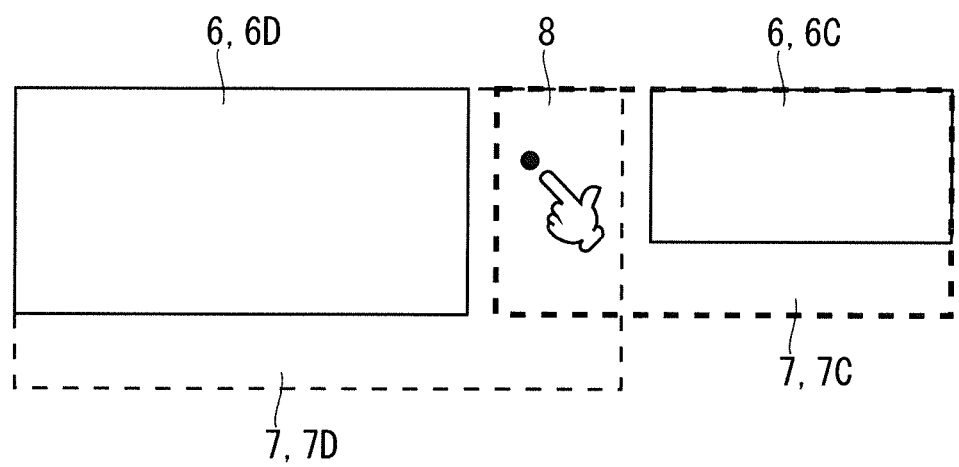
FIG. 10 is a diagram showing an example of the operation regions and the expanded operation regions in the second embodiment.

FIG. 10 is a diagram showing an example of the operation regions 6 and the expanded operation regions 7 in the second embodiment. The operation detected by the operation detection unit 10 has been input to an overlap region 8 formed by an expanded operation region 7C and the other expanded operation region 7D. Of the plurality of operation regions 6, an area of an operation region 6C corresponding to the expanded operation region 7C shown on the right side is smaller than an area of the other operation region 6D corresponding to the other expanded operation region 7D shown on the left side. Therefore, the operation region control unit 20 preferentially selects the expanded operation region 7C corresponding to the right operation region 6C having an area smaller than the area of the other operation region 6D as the one expanded operation region that receives the operation detected by the operation detection unit 10.

In step S160, the operation region control unit 20 further selects the operation region 6C corresponding to the selected expanded operation region 7C.

In step S170, the information processing device 120 executes the function associated with the operation region 6C.

In step S180, the display device 130 displays, in the display region 131, a screen to be displayed during the execution of the function or after the execution of the function. That is, the display device 130 performs display in which the state based on the operation is fed back in the display region 131.

(Effect)

In summary, the predetermined priority condition used by the input control device 100 in the second embodiment is to preferentially select the expanded operation region 7C corresponding to the operation region 6C having an area smaller than the area of the other operation region 6D out of the plurality of operation regions 6 as the one expanded operation region.

The user is liable to perform an erroneous operation in an operation on the operation region 6C having an area smaller than the area of the other operation region 6D. The input control device 100 having the above configuration improves the recognition accuracy in the operation by preferentially selecting the expanded operation region 7C that corresponds to the operation region 6C having the small area.

When the input device 110 is mounted on the vehicle, the user is liable to perform an erroneous operation due to shaking of the vehicle or the like. Thus, the expanded operation region tends to be set large, and an overlap region is easily generated. Therefore, the present invention is more effective when the input device 110 is mounted on the vehicle.

Further, not only when an operation is input to one overlap region 8, but also when an operation is input to any one of the plurality of expanded operation regions, the above effect can be obtained by the input control device performing the same operation as described above. For example, in a case where there are three expanded operation regions, the same effect as described above also occurs when there are a plurality of overlap regions where any two expanded operation regions overlap each other.

The operation device 200 in the second embodiment includes the input control device 100 and the input device 110.

With the configuration described above, it is possible for the operation device 200 to improve the recognition accuracy in an operation that is input to at least one overlap region where each of the plurality of expanded operation regions 7 overlaps each other. The operation device 200 can accurately recognize the operation reflecting the intention of the user, so that the operability of the input device 110 by the user can be improved in an appropriate manner.

Also, when the input device 110 is integral with the display device 130, the operation device includes both the input control device 100 and the display device 130. Even with such a configuration, the same effect as described above can be obtained.

Modification 1 of Second Embodiment

In an input control device in Modification 1 of the second embodiment, the operation region control unit 20 preferentially selects, as a predetermined priority condition, an expanded operation region expanded by an expansion width larger than the other expanded operation region out of the plurality of expanded operation regions 7 as one expanded operation region that receives the operation detected by the operation detection unit 10. The expansion width is the difference between the length of the expanded operation region 7 in a specific direction and the length of the operation region 6 corresponding to the expanded operation region 7 in the specific direction.

Figure 11:
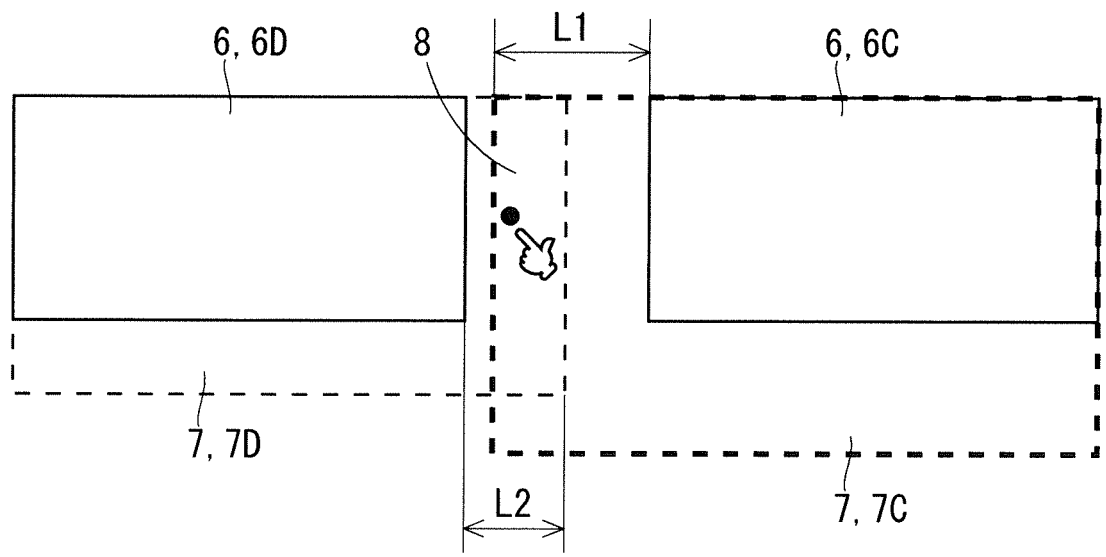
FIG. 11 is a diagram showing an example of operation regions and expanded operation regions in Modification 1 of the second embodiment.

FIG. 11 is a diagram showing an example of operation regions 6 and expanded operation regions 7 in Modification 1 of the second embodiment. The operation detected by the operation detection unit 10 has been input to an overlap region 8 formed by an expanded operation region 7C and the other expanded operation region 7D. An expansion width L1 in the lateral direction of the expanded operation region 7C shown on the right side is larger than an expansion width L2 in the lateral direction of the other expanded operation region 7D shown on the left side. The operation region control unit 20 preferentially selects the right expanded operation region 7C expanded by the expansion width L1 larger than the expansion width L2 out of the plurality of expanded operation regions 7 as the one expanded operation region that receives the operation detected by the operation detection unit 10.

The operation region control unit 20 may select the one expanded operation region that receives the operation detected by the operation detection unit 10 based on the expansion width in the vertical direction.

As shown in the second embodiment, the expanded operation region 7 is set based on the operation history database. Hence, the operation region 6 having a large expansion width means that the frequency of erroneous operations by the user is high. The input control device in Modification 1 of the second embodiment preferentially selects the expanded operation region 7C expanded by the expansion width L1 larger than the expansion width L2 of the other expanded operation region 7D. Thus, the input control device improves the recognition accuracy in an operation input by the user. In particular, the configuration is more effective when the specific direction is a direction in which each of the expanded operation regions overlaps.

Modification 2 of Second Embodiment

In an input control device in Modification 2 of the second embodiment, the operation region control unit 20 preferentially selects, as a predetermined priority condition, an expanded operation region expanded at an expansion ratio larger than the other expanded operation region out of the plurality of expanded operation regions 7 as one expanded operation region that receives the operation detected by the operation detection unit 10. The expansion ratio is the ratio between the length of the expanded operation region 7 in a specific direction and the length of the operation region 6 corresponding to the expanded operation region 7 in the specific direction.

Figure 12:
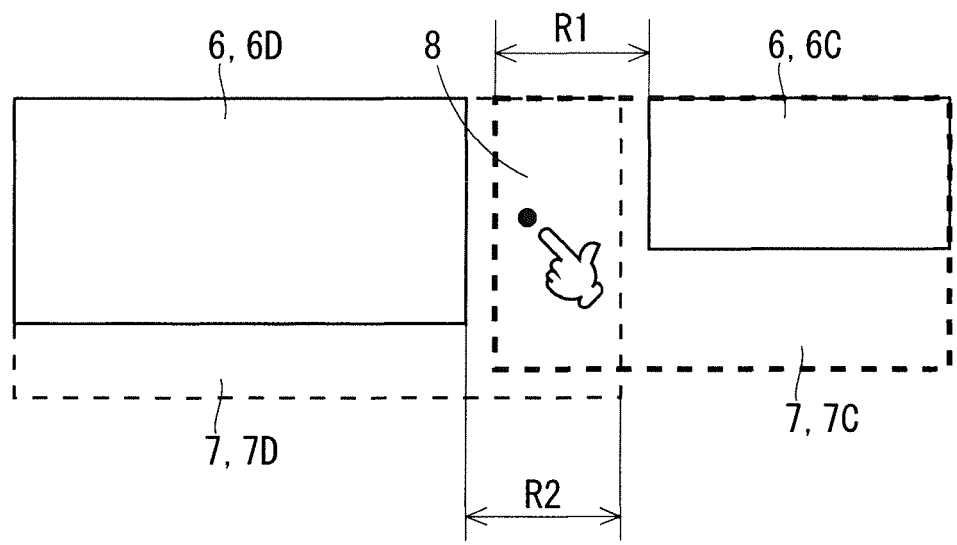
FIG. 12 is a diagram showing an example of operation regions and expanded operation regions in Modification 2 of the second embodiment.

FIG. 12 is a diagram showing an example of operation regions 6 and expanded operation regions 7 in Modification 2 of the second embodiment. The operation detected by the operation detection unit 10 has been input to an overlap region 8 formed by an expanded operation region 7C and the other expanded operation region 7D. An expansion ratio R1 in the lateral direction of the expanded operation region 7C shown on the right side is larger than an expansion ratio R2 in the lateral direction of the other expanded operation region 7D shown on the left side. The operation region control unit 20 preferentially selects the right expanded operation region 7C expanded at the expansion ratio R1 larger than the expansion ratio R2 out of the plurality of expanded operation regions 7 as the one expanded operation region that receives the operation detected by the operation detection unit 10.

The operation region control unit 20 may select the one expanded operation region that receives the operation detected by the operation detection unit 10 based on the expansion ratio in the vertical direction.

As shown in the second embodiment, the expanded operation region 7 is set based on the operation history database. Hence, the operation region 6 having a large expansion ratio means that the rate of an erroneous operation by the user is high. The input control device in Modification 2 of the second embodiment preferentially selects the expanded operation region 7C expanded at the expansion ratio R1 larger than the expansion ratio R2 of the other expanded operation region 7D. Thus, the input control device improves the recognition accuracy in an operation input by the user.

Modification 3 of Second Embodiment

In an input control device in Modification 3 of the second embodiment, the operation region control unit 20 preferentially selects, as a predetermined priority condition, an expanded operation region that corresponds to the operation region that receives the operation having a difficulty level higher than the other region out of the plurality of operation regions 6 as one expanded operation region that receives the operation detected by the operation detection unit 10. The difficulty level of the operation is the difficulty level of a gesture predetermined for each operation region 6 or for each function to be executed.

Figure 13:
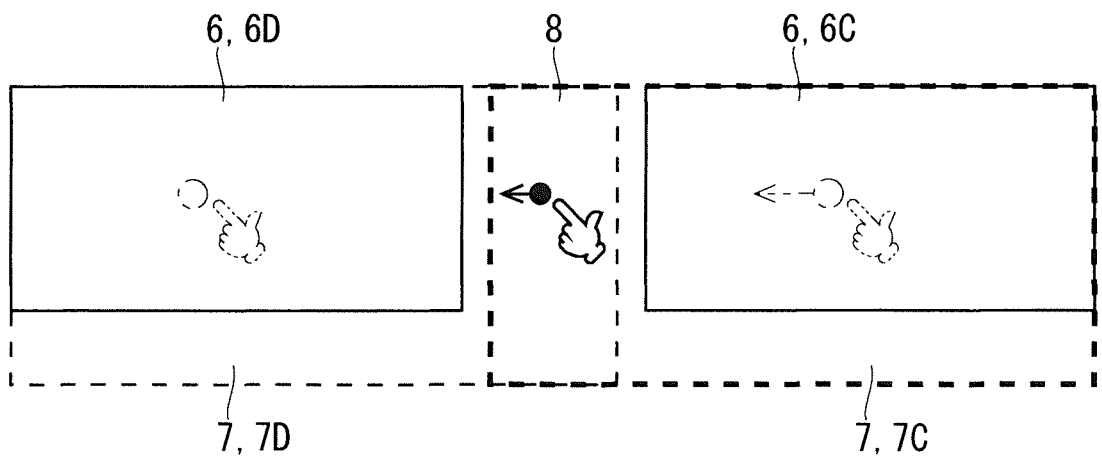
FIG. 13 is a diagram showing an example of operation regions and expanded operation regions in Modification 3 of the second embodiment.

FIG. 13 is a diagram showing an example of operation regions 6 and expanded operation regions 7 in Modification 3 of the second embodiment. The operation detected by the operation detection unit 10 has been input to an overlap region 8 formed by an expanded operation region 7C and the other expanded operation region 7D. Operations received by the operation region 6C shown on the right include dragging as the predetermined gesture. Operations received by the other operation region 6D shown on the left side include tapping as the predetermined gesture. The difficulty level of the dragging is higher than the difficulty level of the tapping. The operation region control unit 20 selects the right expanded operation region 7C corresponding to the operation region 6C that receives a difficulty level higher than the difficulty level of the operation in the other operation region 6D as the one expanded operation region that receives the operation detected by the operation detection unit 10.

When operations including a complicated gesture with a high difficulty level are required, the rate of an erroneous operation by the user is high. The input control device in Modification 3 of the second embodiment preferentially expands the expanded operation region 7C corresponding to the operation region 6C that requires operations including the gesture with a high difficulty level. The input control device thereby improves the recognition accuracy in the operation.

Third Embodiment

An input control device and an input control method in a third embodiment will be described. Note that descriptions of the similar configuration and operation as those of the first or second embodiment will be omitted.

Figure 14:
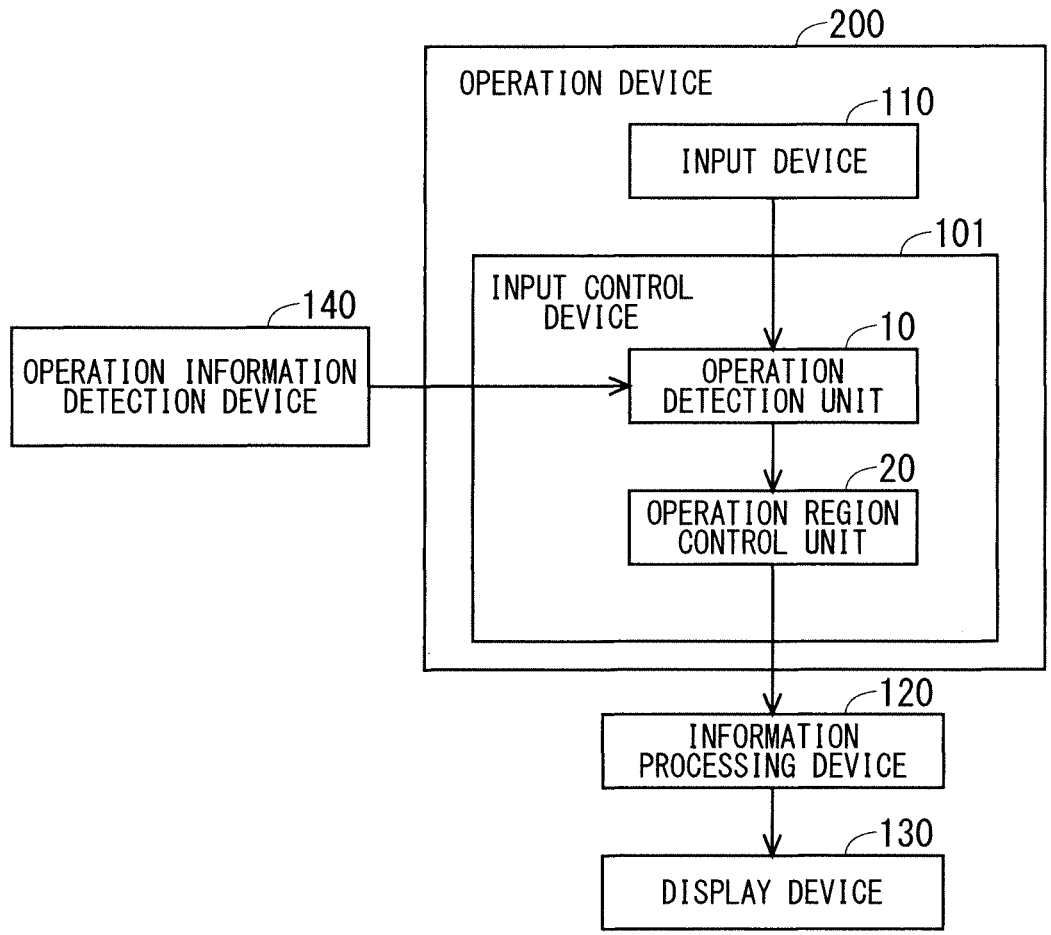
FIG. 14 is a block diagram showing a configuration of an input control device, an operation device, and devices that operate in association with those devices in a third embodiment.

FIG. 14 is a block diagram showing a configuration of an input control device 101, an operation device 200, and devices that operate in association with those devices in the third embodiment. In FIG. 14, an operation information detection device 140 is shown as the device that operates in association with the input control device 101.

The input device 110 is provided in the vehicle. In the third embodiment, a plurality of operations are simultaneously input to the plurality of expanded operation regions 7 by the driver of the vehicle and the occupant of the vehicle except for the driver.

An operation information detection device 140 detects information on the plurality of operations by the driver and the occupant. The information on the plurality of operations includes a determination result of whether or not the input operation is an operation by the driver. The operation information detection device 140 includes, for example, a camera. In this case, the operation information detection device 140 determines whether or not the input operation is an operation by the driver based on an image photographed by the camera. However, the operation information detection device 140 is not limited to the camera but may be other sensors or the like.

An operation detection unit 10 acquires information on the plurality of operations from the operation information detection device 140. Based on the information, the operation detection unit 10 detects an operation by the driver out of the plurality of operations.

An operation region control unit 20 performs the control described in each embodiment, giving priority to the operation by the driver.

Figure 15:
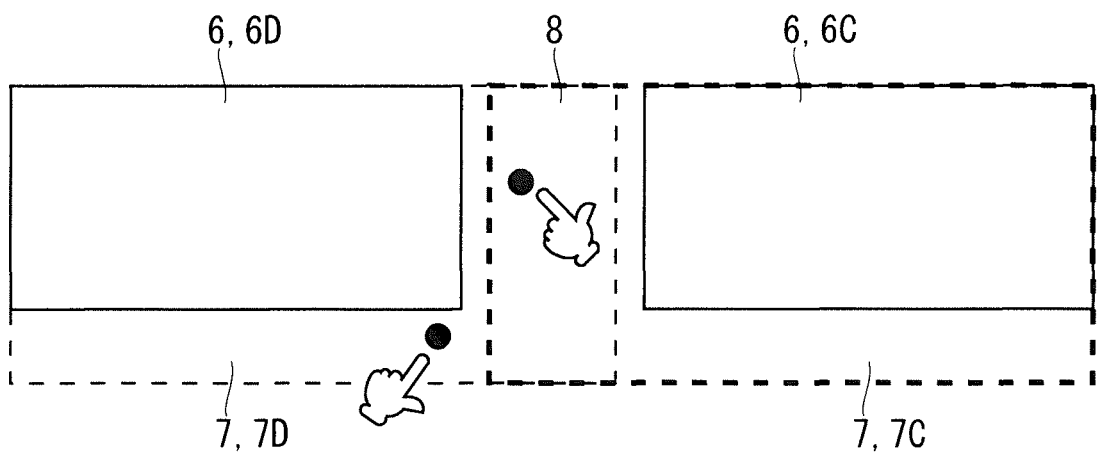
FIG. 15 is a diagram showing an example of operation regions and expanded operation regions in the third embodiment.

FIG. 15 is a diagram showing an example of operation regions 6 and expanded operation regions 7 in the third embodiment. One operation has been input to an overlap region 8 formed by expanded operation regions 7C, 7D. The other operation has been input to the other expanded operation region 7D on the left side. The two operations are input simultaneously. The operation detection unit 10 determines that the one operation having been input to the overlap region 8 is an operation by the driver based on the information on the plurality of operations detected by the operation information detection device 140.

The operation region control unit 20 performs the control described in each embodiment on the operation performed by the driver and input to the overlap region 8.

FIG. 15 has shown an example where the overlap region 8 is generated in which a part of each of the two expanded operation regions 7C, 7D overlaps. However, even when two of three expanded operation regions overlap with each other to form two or more overlap regions, the above effect is achieved. That is, even when an operation by the driver is input to one overlap region and an operation by the occupant except for the driver is input to the other overlap region, the operation region control unit 20 recognizes the operation by the driver and performs the control described in each embodiment on the operation by the driver.

In summary, in the input control device 101 in the third embodiment, the operation that is input to the at least one overlap region 8 is one of the plurality of operations simultaneously input to the plurality of expanded operation regions 7 by the driver of the vehicle and the occupant of the vehicle via the input device 110 provided in the vehicle. The operation detection unit 10 acquires information on the plurality of operations by the driver and the occupant, and based on the information, the operation detection unit 10 preferentially detects the one operation by the driver out of the plurality of operations as an operation that is input to the at least one overlap region 8.

When a plurality of passengers onboard the vehicle simultaneously operate the input device 110 mounted on the vehicle, an erroneous operation is more likely to occur in an operation by the driver than an operation by an occupant except for the driver. The input control device 101 in Modification 3 of the second embodiment improves the recognition accuracy in the operation by preferentially selecting the operation by the driver.

Fourth Embodiment

An input control device and an input control method in a fourth embodiment will be described. The diagram showing the configuration of the input control device in the fourth embodiment is the same as FIG. 14.

Figure 16:
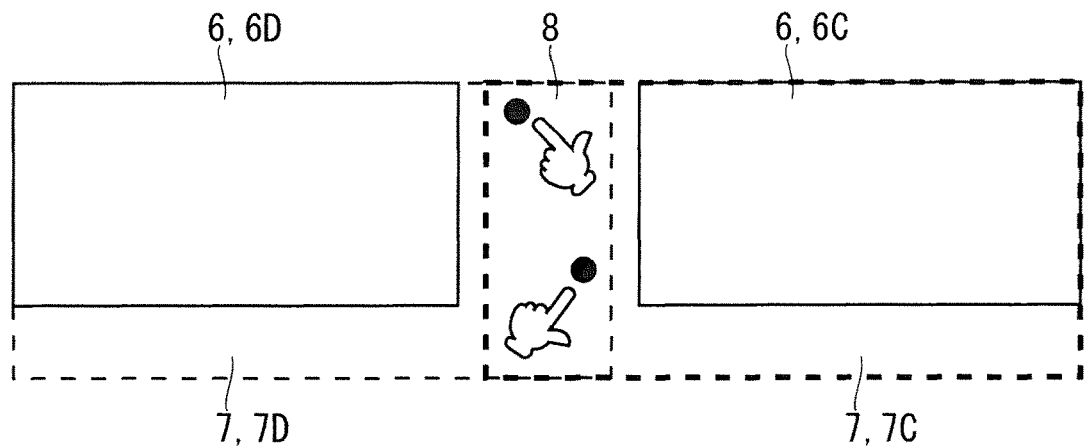
FIG. 16 is a diagram showing an example of operation regions and expanded operation regions in a fourth embodiment.

FIG. 16 is a diagram showing an example of operation regions 6 and expanded operation regions 7 in the fourth embodiment. Two operations have been input to an overlap region 8 formed by expanded operation regions 7C, 7D. The two operations are input simultaneously. One of the two operations is an operation by the driver, and the other operation is an operation by the occupant.

An operation detection unit 10 acquires information on two operations from an operation information detection device 140. Based on the information, the operation detection unit 10 detects each of the operation by the driver and the operation by the occupant.

The operation region control unit 20 performs control according to any one of the embodiments (including a fifth embodiment to be described later) or the modifications of the second embodiment on each of the operation by the driver and the operation by the occupant. That is, the operation region control unit 20 controls the plurality of expanded operation regions such that one operation region receives one of the operation by the driver and the operation by the occupant based on a predetermined priority condition.

Fifth Embodiment

An input control device and an input control method in a fifth embodiment will be described. Note that descriptions of the similar configuration and operation as those of any one of the first to fourth embodiments will be omitted.

Figure 17:
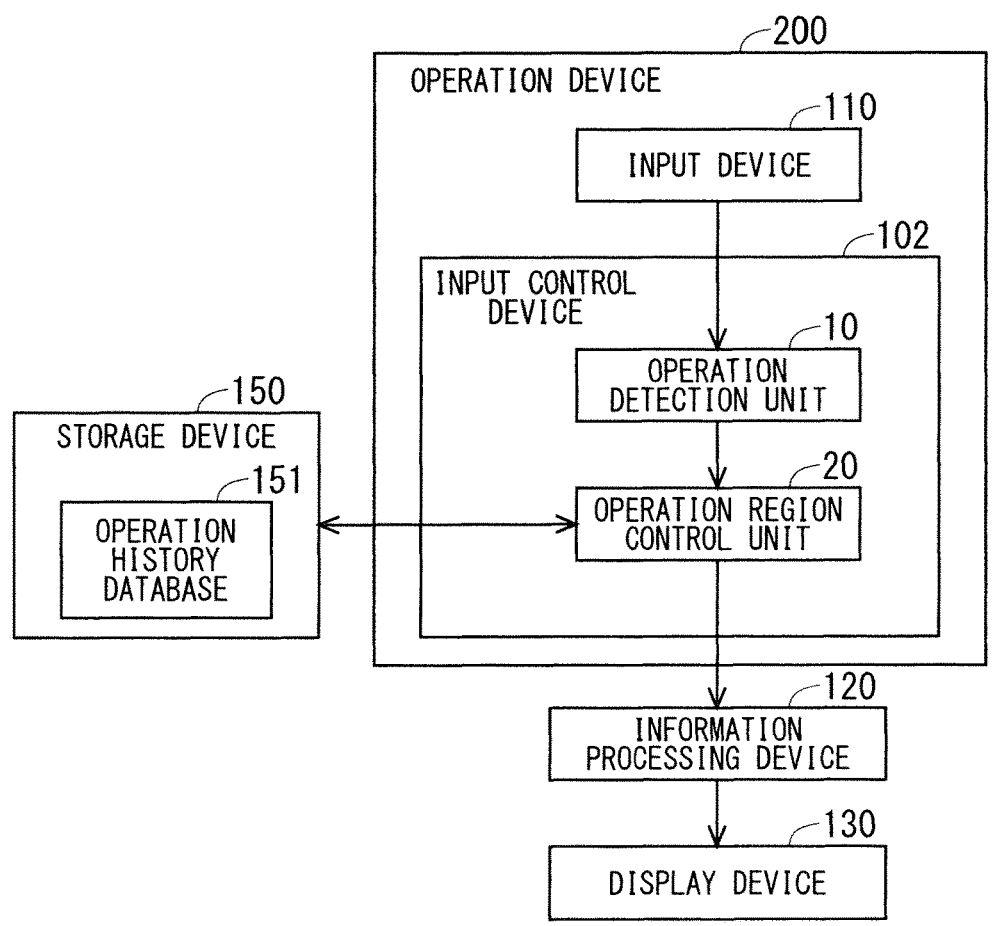
FIG. 17 is a block diagram showing a configuration of an input control device, an operation device, and devices that operate in association with those devices in a fifth embodiment.

FIG. 17 is a block diagram showing a configuration of an input control device 102, an operation device 200, and devices that operate in association with those devices in the embodiment. In FIG. 17, a storage device 150 is shown as the device that operates in association with the input control device 102.

The storage device 150 stores an operation history database 151. The operation history database 151 contains data on the operation frequency that indicates the number of operations performed on each operation region 6.

An operation region control unit 20 preferentially selects, as a predetermined priority condition, an expanded operation region corresponding to an operation region with an operation frequency higher than that of the other operation region out of the plurality of operation regions 6 based on the operation history database 151 as one expanded operation region.

FIG. 18 is a diagram showing an example of operation regions 6 and expanded operation regions 7 in the fifth embodiment. The operation detected by the operation detection unit 10 has been input to an overlap region 8 formed by an expanded operation region 7C and the other expanded operation region 7D. The operation frequency of the operation region 6C shown on the right side is higher than the operation frequency of the operation region 6D shown on the left side. Therefore, the operation region control unit 20 preferentially selects the expanded operation region 7C corresponding to the right operation region 6C with an operation frequency higher than that of the other operation region 6D as one expanded operation region that receives the operation detected by the operation detection unit 10.

The number of erroneous operations in the operation region 6C with a higher operation frequency is larger than the number of erroneous operations in the operation region 6D with a lower operation frequency. The input control device 102 in the fifth embodiment improves the recognition accuracy in the operation by preferentially selecting the expanded operation region 7C that corresponds to the operation region 6C with a higher operation frequency.

Sixth Embodiment

An input control device and an input control method in a sixth embodiment will be described. Note that descriptions of the similar configuration and operation as those of any one of the first to fourth embodiments will be omitted.

The input control device described in each embodiment can also be applied to a system constructed by appropriately combining a navigation device, a communication terminal, a server, and functions of applications installed therein. Here, the navigation device includes, for example, a portable navigation device (PND). The communication terminals include, for example, mobile terminals such as mobile phones, smartphones, and tablets.

Figure 19:
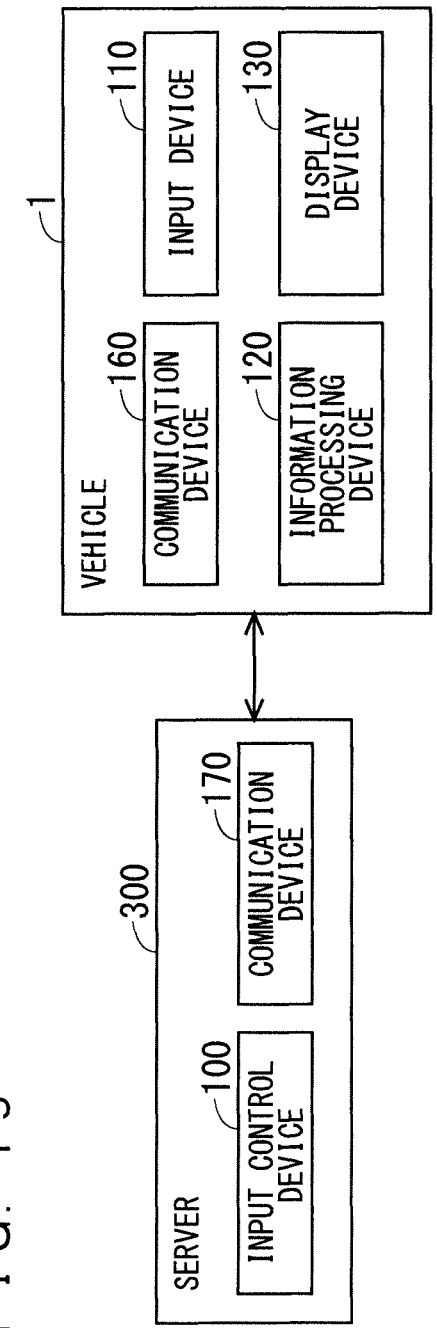
FIG. 19 is a block diagram showing a configuration of an input control device and devices that operate in association therewith in a sixth embodiment.

FIG. 19 is a block diagram showing a configuration of an input control device 100 and devices that operate in association therewith in the sixth embodiment.

The input control device 100 and a communication device 170 are provided in a server 300. An input device 110, an information processing device 120, a display device 130, and a communication device 160 are provided in a vehicle 1. An operation is inputted, via the input device 110, to an overlap region 8 in a display region 131 of the display device 130 provided in the vehicle 1. The input control device 100 detects the operation via the communication device 160 and the communication device 170. The input control device 100 selects one expanded operation region that receives the operation out of a plurality of expanded operation regions 7 having the overlap region 8, based on a predetermined priority condition. Based on the selection result acquired via each communication device, the information processing device 120 executes a function associated with the operation.

By disposing the input control device 100 in the server 300, the configuration of an on-vehicle device can be simplified.

In addition, some of the functions or components of the input control device 100 may be provided in the server 300, and others may be provided in the vehicle 1 in a distributed manner.

In the present invention, it is possible to freely combine the embodiments and to modify or omit each embodiment as appropriate within the scope of the present invention.

While the present invention has been described in detail, the above description is in all aspects illustrative, and the present invention is not limited thereto. It is understood that innumerable modifications not illustrated can be envisaged without departing from the scope of the present invention.

EXPLANATION OF REFERENCE SIGNS

6: operation region
7: expanded operation region

8: overlap region
10: operation detection unit
20: operation region control unit
100: input control device
110: input device
120: information processing device
130: display device
131: display region
140: operation information detection device
150: storage device
151: operation history database
200: operation device

The invention claimed is:

1. An input control device configured to control a plurality of expanded operation regions based on operations that are input to the plurality of expanded operation regions via an input device, a plurality of operation regions configured to receive respective operations and the plurality of expanded operation regions that are expanded in association with the plurality of operation regions being provided in a display region of a display device, the input control device comprising:

a processor to execute a program; and
a memory to store the program which, when executed by the processor, causes the processor to perform processes of detecting an operation that is input to at least one overlap region where a part of each of the plurality of expanded operation regions overlaps each other; and selecting one expanded operation region that receives the operation out of the plurality of expanded operation regions having the at least one overlap region, based on a predetermined priority condition, then controlling the plurality of expanded operation regions such that, of the plurality of operation regions, one operation region corresponding to the one expanded operation region receives the operation, wherein the operation that is input to the at least one overlap region is one of two operations simultaneously input to the plurality of expanded operation regions, the two operations including one operation inputted by a driver of a vehicle and another operation inputted by an occupant of the vehicle via the input device provided in the vehicle, and the processes performed by the processor further include acquiring information on the plurality of operations by the driver and the occupant, and preferentially detecting, based on the information, the one operation by the driver out of the two operations as the operation that is input to the at least one overlap region such that the other operation by the occupant out of the two operations is ignored.

2. An input control device configured to control a plurality of expanded operation regions based on operations that are input to the plurality of expanded operation regions via an input device, a plurality of operation regions configured to receive respective operations and the plurality of expanded operation regions that are expanded in association with the plurality of operation regions being provided in a display region of a display device, the input control device comprising:

a processor to execute a program; and
a memory to store the program which, when executed by the processor, causes the processor to perform processes of detecting an operation that is input to at least one overlap region where a part of each of the plurality of expanded operation regions overlaps each other; and selecting one expanded operation region that receives the operation out of the plurality of expanded operation regions having the at least one overlap region, based on a predetermined priority condition, then controlling the plurality of expanded operation regions such that, of the plurality of operation regions, one operation region corresponding to the one expanded operation region receives the operation, wherein the predetermined priority condition is to preferentially select, without regard to any distances between a point at which the operation is input and the respective operation regions associated with the plurality of expanded regions having the at least one overlap region, an expanded operation region expanded by an expansion width larger than an expansion width that is a difference between a length of the other expanded operation region in a specific direction and a length of the other operation region corresponding to the other expanded operation region in the specific direction, out of the plurality of expanded operation regions, as the one expanded operation region.

3. An input control device configured to control a plurality of expanded operation regions based on operations that are input to the plurality of expanded operation regions via an input device, a plurality of operation regions configured to receive respective operations and the plurality of expanded operation regions that are expanded in association with the plurality of operation regions being provided in a display region of a display device, the input control device comprising:

a processor to execute a program; and
a memory to store the program which, when executed by the processor, causes the processor to perform processes of detecting an operation that is input to at least one overlap region where a part of each of the plurality of expanded operation regions overlaps each other; and selecting one expanded operation region that receives the operation out of the plurality of expanded operation regions having the at least one overlap region, based on a predetermined priority condition, then controlling the plurality of expanded operation regions such that, of the plurality of operation regions, one operation region corresponding to the one expanded operation region receives the operation, wherein the predetermined priority condition is to preferentially select an expanded operation region corresponding to an operation region operated at an erroneous operation frequency higher than an erroneous operation frequency with respect to the other operation region out of the plurality of operation regions, as the one expanded operation region, based on a database containing data on the operation frequency with respect to each of the operation regions.

* * * * *